(12) United States Patent
Kuhnt

(10) Patent No.: US 9,248,718 B2
(45) Date of Patent: Feb. 2, 2016

(54) ADJUSTMENT DEVICE FOR A VEHICLE CHASSIS, COMPRISING A SLIDING PAD

(71) Applicant: ZF Friedrichshafen AG, Friedrichshafen (DE)

(72) Inventor: Torsten Kuhnt, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/361,749

(22) PCT Filed: May 21, 2013

(86) PCT No.: PCT/EP2013/060344
§ 371 (c)(1),
(2) Date: May 30, 2014

(87) PCT Pub. No.: WO2013/189679
PCT Pub. Date: Dec. 27, 2013

(65) Prior Publication Data
US 2015/0123366 A1  May 7, 2015

(30) Foreign Application Priority Data

Jun. 18, 2012 (DE) .......................... 10 2012 210 225

(51) Int. Cl.
*B62D 15/02* (2006.01)
*B60G 99/00* (2010.01)
*B62D 5/04* (2006.01)

(52) U.S. Cl.
CPC ............ *B60G 99/002* (2013.01); *B62D 5/0445* (2013.01); *B62D 15/0225* (2013.01)

(58) Field of Classification Search
CPC .................... B60G 2200/462; B60G 2204/62; B60G 2202/422; B60G 2200/46; B60G 2200/44; B60G 2202/42; B60G 2800/915; B60G 2204/423; B60G 2204/4232; B60G 3/01; B60G 3/26; B60G 7/003; B60G 7/005; B60G 2204/61; B60G 7/006; B60G 99/002; B62D 5/0406; B62D 7/1581; B62D 17/00; B62D 5/0445; B62D 15/0225; F16H 25/2015; F16H 2025/2087

See application file for complete search history.

(56) References Cited

U.S. PATENT DOCUMENTS 6,224,075 B1 *  5/2001  McIntyre .................. 280/86.751
6,485,038 B1 * 11/2002  Garrard ....................... 280/86.75

(Continued)

FOREIGN PATENT DOCUMENTS

EP    1 911 660 A1    4/2008
WO    2005/090144 A1  9/2005

OTHER PUBLICATIONS

German Search Report Corresponding to 10 2012 210 225.6 mailed Mar. 30, 2014.

(Continued)

*Primary Examiner* — Paul N Dickson
*Assistant Examiner* — Timothy Wilhelm
(74) *Attorney, Agent, or Firm* — Davis & Bujold, P.L.L.C.; Michael J. Bujold

(57) ABSTRACT

An adjustment device (1) for a chassis of a vehicle. The adjustment device includes at least one spindle (2), at least one slide-block (3), an axial guide (5) for the slide-block (3) and at least one connecting element (4, 17). The connecting element (4) is arranged, on the one hand, in a rotationally fixed manner on the spindle (2), and, on the other hand, is connected to the slide-block (3). The adjustment device (1) has an articulated joint (21) provided between the connecting element (4) and the slide-block (3).

16 Claims, 11 Drawing Sheets

(56) References Cited

U.S. PATENT DOCUMENTS

| | | | |
|---|---|---|---|
| 6,557,872 B1* | 5/2003 | Garrard | 280/86.751 |
| 7,278,648 B2* | 10/2007 | Bobbitt et al. | 280/86.751 |
| 7,513,514 B1* | 4/2009 | Schlosser et al. | 280/93.511 |
| 7,857,332 B2* | 12/2010 | Hsu | 280/86.757 |
| 2006/0022420 A1* | 2/2006 | Pressler et al. | 280/93.512 |
| 2010/0019465 A1* | 1/2010 | Yuta et al. | 280/86.758 |
| 2010/0204888 A1* | 8/2010 | Nishioka | 701/41 |
| 2011/0284313 A1* | 11/2011 | Jungbecker et al. | 180/444 |
| 2014/0353067 A1* | 12/2014 | Fujii et al. | 180/444 |

OTHER PUBLICATIONS

International Search Report Corresponding to PCT/EP2013/060344 mailed Sep. 6, 2013.

Written Opinion Corresponding to PCT/EP2013/060344 mailed Sep. 6, 2013.

* cited by examiner

ADJUSTMENT DEVICE FOR A VEHICLE CHASSIS, COMPRISING A SLIDING PAD

This application is a National Stage completion of PCT/EP2013/060344 filed May 21, 2013, which claims priority from German patent application serial no. 10 2012 210 225.6 filed Jun. 18, 2012.

FIELD OF THE INVENTION

The present invention concerns an adjustment device for a vehicle chassis, comprising at least one spindle, at least one sliding pad, an axial guide for the slide-block and at least one connecting element, which connecting element is on the one hand arranged on the spindle in a rotationally fixed manner and on the other hand connected to the slide-block.

BACKGROUND OF THE INVENTION

One objective of chassis development is to produce assemblies which are as robust and as little prone to wear as possible.

From the prior art, adjustment devices with slide-blocks are known, in which the slide-blocks are connected in a fixed manner, i.e. without any degree of freedom for relative movement, to the spindle and are guided by guiding means along the spindle axis (axial guiding). The disadvantage of this is that strict demands are made on the tolerances of the connection. Otherwise the system tends to bear down on its edges, causing continual wear thereof and increasing play. As an example of this EP 1 911 660 A1 can be mentioned, from which a connection of the slide-block to the spindle by means of a screw joint is known.

An alternative connection of the prior art provides a connection by means of adjusting springs, wherein the spindle is formed in several parts. The disadvantage here is that assembly thereof is very time-consuming and complicated. Furthermore the joint tends to stick and is also disadvantageous in terms of noise emission.

SUMMARY OF THE INVENTION

The purpose of the present invention is to provide a low-wear, inexpensive adjustment device that overcomes the above-mentioned drawbacks of the prior art.

That objective is achieved by an adjustment device for a vehicle chassis as described below.

The adjustment device according to the invention comprises at least one spindle, at least one slide-block, an axial guide for the slide-block and at least one connecting element, which connecting element is, on the one hand, arranged on the spindle in a rotationally fixed manner and, on the other hand, connected to the slide-block. The adjustment device according to the invention is characterized in that an articulated joint is provided between the connecting element and the slide-block. Thus, according to the invention the slide-block is connected to the connecting element by an articulated joint. This makes it possible for the orientation and positioning of the slide-block to be adapted in particular to the dimensions and design of the axial guide, which simplifies assembly compared with the previously known prior art and also increases the lifetime of the arrangement.

An advantageous embodiment of the adjustment device according to the invention is characterized in that the distance from the articulated joint to the spindle axis is in the range 5 to 50 mm, preferably in the range 10 to 30 mm and best of all in the range 15 to 25 mm. Tests by the applicant have shown this to be particularly advantageous.

Advantageously, at least on its side surfaces or skid surfaces in contact with the axial guide the slide-block is made of polyacetal (also known as polyoxymethylene or POM) or a fiber-reinforced POM or a material resistant to elevated temperatures, preferably PTFE (polytetrafluoroethylene) or PTFE or a polyphenylsulfide (PPS), such as PPS GF40 PTFE5 (a PPS with a glass-fiber content of 40%). Making at least part of the slide-block of polyacetal (POM) reduces the noise emitted when the slide-block moves over the sliding surfaces of the axial guide. In addition or alternatively, one of the above-mentioned materials resistant to elevated temperatures can be considered. In the context of the invention resistant to elevated temperatures means resistant to temperatures in the range above 80° C.

In a further preferred embodiment of the adjustment device according to the invention, the hinge of the articulated joint can be locked. Thus, once the orientation of the slide-block and the connecting element have been matched, the articulated joint can be fixed. This enables precise setting and final adjustment of the slide-block guide during assembly when the adjustment device is operated the articulated connection can be "exploited" if a defined guiding is desired.

An advantageous embodiment of the adjustment device according to the invention is characterized in that the articulated joint is in the form of a ball-and-socket joint with a joint head and a joint cup. Such a structure of the articulated joint provides a robust and simply designed connecting arrangement. In this case it is advantageous for the joint head to be arranged on the connecting element and the joint cup on the slide-block.

In a preferred embodiment of the adjustment device according to the invention, the joint head is braced within the joint cup of the slide-block, in particular in order to lock the articulated joint. In general this means that the mobility of the articulated joint between the slide-block and the connecting element is adjustable, preferably continuously adjustable.

A further preferred embodiment of the adjustment device according to the invention is characterized in that at least one aperture is provided in the slide-block, through which a tool for actuating the expansion means can be introduced, the aperture being formed on a side of the slide-block that faces away from the spindle.

Advantageously, a locating element is arranged over the slide-block for centering the slide-block and/or to hold it in a neutral position. This locating element can for example be in the form of a sealing element, preferably an O-ring seal.

An alternative preferred embodiment of the adjustment device according to the invention provides that the slide-block comprises an elastic joint element that forms an articulated joint in the manner of a rubber mounting. Such an embodiment variant has the particular advantage that the use of a rubber mounting has a desirable effect on noise emission. Moreover, a rubber mounting is simple and inexpensive to produce and requires no maintenance in operation.

Advantageously the slide-block has flat side elements, which can be fixed directly on the elastic joint element. That has the advantage of being a simple, integral structure.

A preferred embodiment of the adjustment device according to the invention that relates to the structure of the rubber mounting provides that the slide-block comprises a fastening element, which is designed for fitting the slide-block onto the connecting element. Advantageously the fastening element is embedded in the elastic joint element, the fastening element being in the form of an inner sleeve.

In a preferred embodiment of the adjustment device according to the invention, a holder is provided on the slide-block for a sensor impulse emitter, preferably a magnet. This has the advantage of integrating two functions in one component. On the one hand the slide-block runs in the axial guide, and on the other hand it enables the attachment of a receiving fixture or holder for a sensor impulse emitter. This makes for a space-saving design of the adjustment device as a whole. The sensor impulse emitter or its associated sensor serves in particular for detecting the position of the slide-block and thus for monitoring the function of the adjustment device. However, it is not strictly necessary to integrate these two functions in one component; rather, it is also within the scope of the invention to arrange the sensor impulse emitter separately on the spindle.

Advantageously, the holder comprises at least one detent element which, when the holder is fitted onto a slide-block, co-operates with a complementary retaining structure or the slide-block. The fixing of the holder by means of detent elements to a retaining structure of the slide-block in the manner of a clip-on connection makes it possible to detach the connection, the arrangement being easy to assemble and release again, but nevertheless provides a reliable and lasting connection of the two components, slide-block and sensor impulse emitter, to one another in the assembled condition.

A preferred embodiment of the adjustment device according to the invention is characterized in that the adjustment device is in the form of a control arm or part of a control arm for the chassis of the vehicle. Tests by the applicant have shown that by virtue of the invention's avoidance of jamming, the adjustment device according to the invention is particularly suitable for use with vehicle control arms or parts thereof.

The adjustment device described above can be used in a chassis to good advantage. Its use in a chassis is characterized in that the adjustment device is part of a rear wheel steering system of the chassis, such that by means of the adjustment device the steering angle at the rear axle can be changed. However, the device can also be used on the front axle to change the steering angle there. When the adjustment device is designed as a control arm or part thereof for the chassis of the vehicle, it can co-operate with a wheel mounting and thus enables the adjustment of the wheel concerned or even both wheels. The connection between the device and at least one wheel mounting is formed by suitable links, preferably ball-and-socket joints.

BRIEF DESCRIPTION OF THE DRAWINGS

Further advantages and characteristics are explained below with reference to example embodiments and to the figures, which show.

DETAILED DESCRIPTION OF THE PREFERRED EMBODIMENTS

Figure 1:
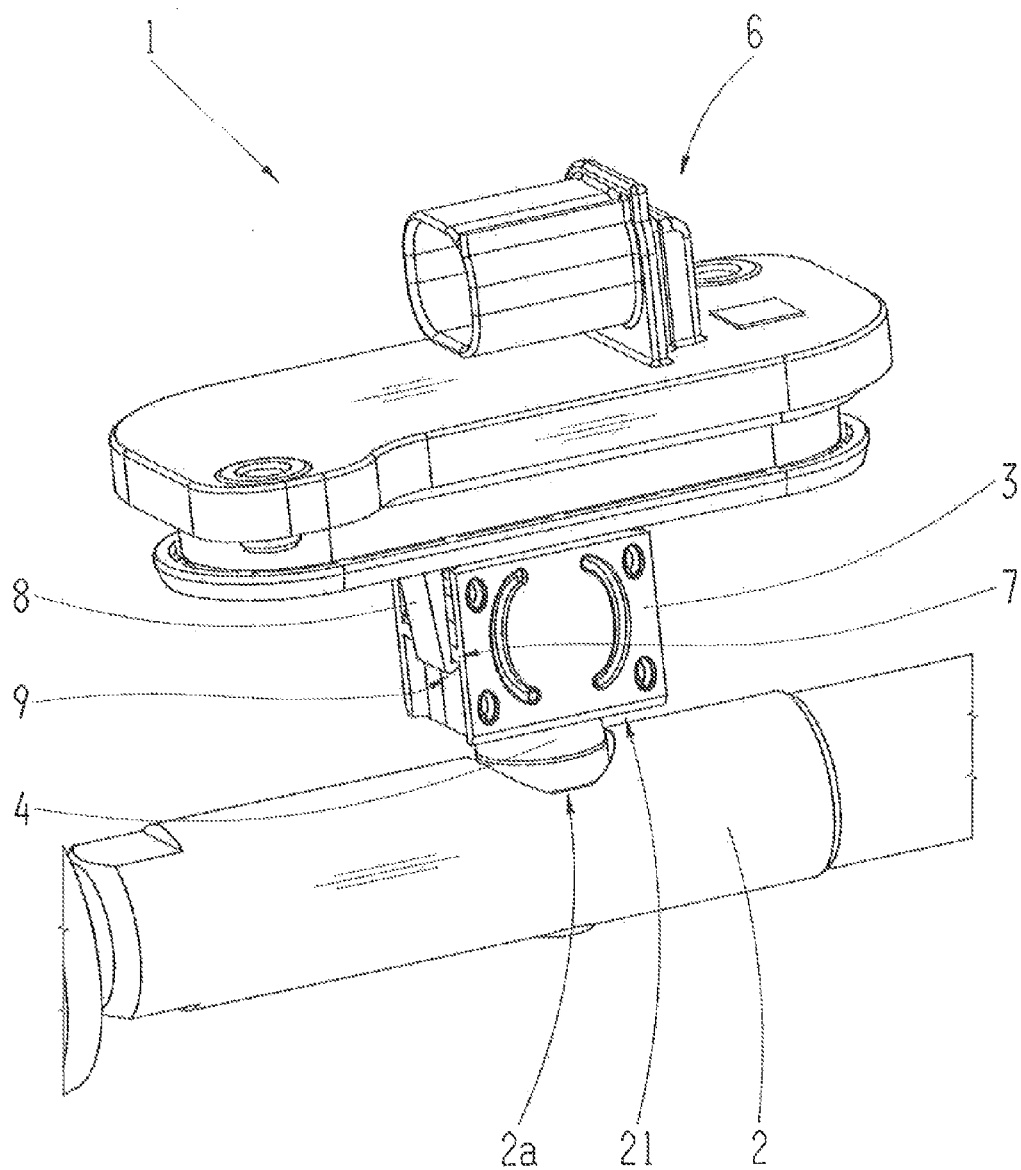
FIG. 1: A perspective overall view of an adjustment device according to the invention in the assembled condition.

FIGS. 1 to 5 show various views of an adjustment device according to the invention or elements thereof, and are described conjointly below.

The adjustment device 1 comprises a spindle 2, which spindle 2 has a holding aperture 2a for a connecting element 4. The connecting element 4 connects a slide-block 3 to the spindle 2. Above the slide-block 3 is arranged a sensor element 6.

In the axial direction of the spindle 2 the slide-block 3 has at both ends a retaining structure 7. The retaining structure 7 is functionally connected to a holder 8, which holder 8 has detent elements 9 that lock onto the retaining structure 7 of the slide-block 3 to attach the holder 8 to the slide-block 3.

Figure 2:
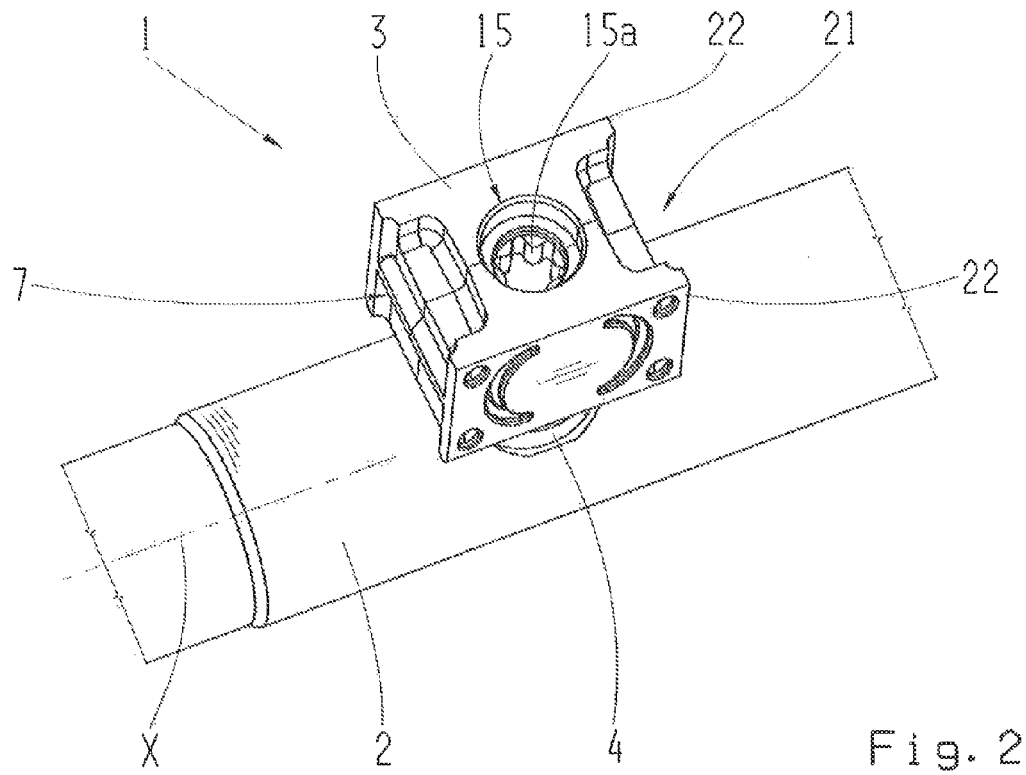
FIG. 2: A view of the slide-block of the adjustment device shown in FIG. 1, when mounted on a spindle.
Figure 3:
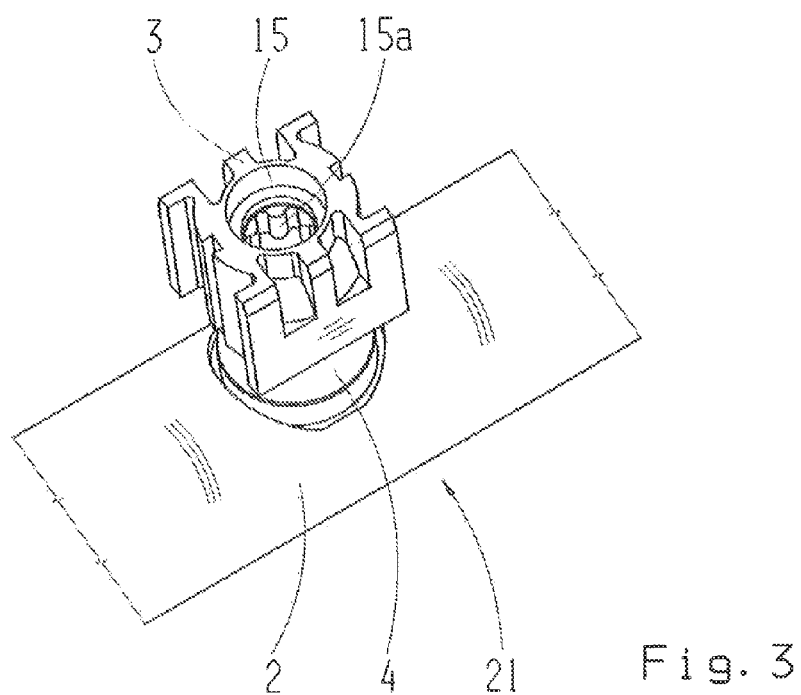
FIG. 3: A view of another slide-block when mounted on the spindle.

FIG. 2 shows an enlarged representation of the slide-block 3 in FIG. 1, but without the sensor element 6 and without the holder 8. This allows the retaining structure 7 of the slide-block 3 to be seen more clearly. FIG. 3 shows an alternative design of the slide-block 3.

As a supplement to FIG. 1, FIGS. 2 and 3 show a bore 15 or opening in the slide-block 3, which enables the insertion of a special tool, especially one with a Torx profile, for actuating an expansion means 15a for the connecting element 4, about which more will be said later.

Figure 4:
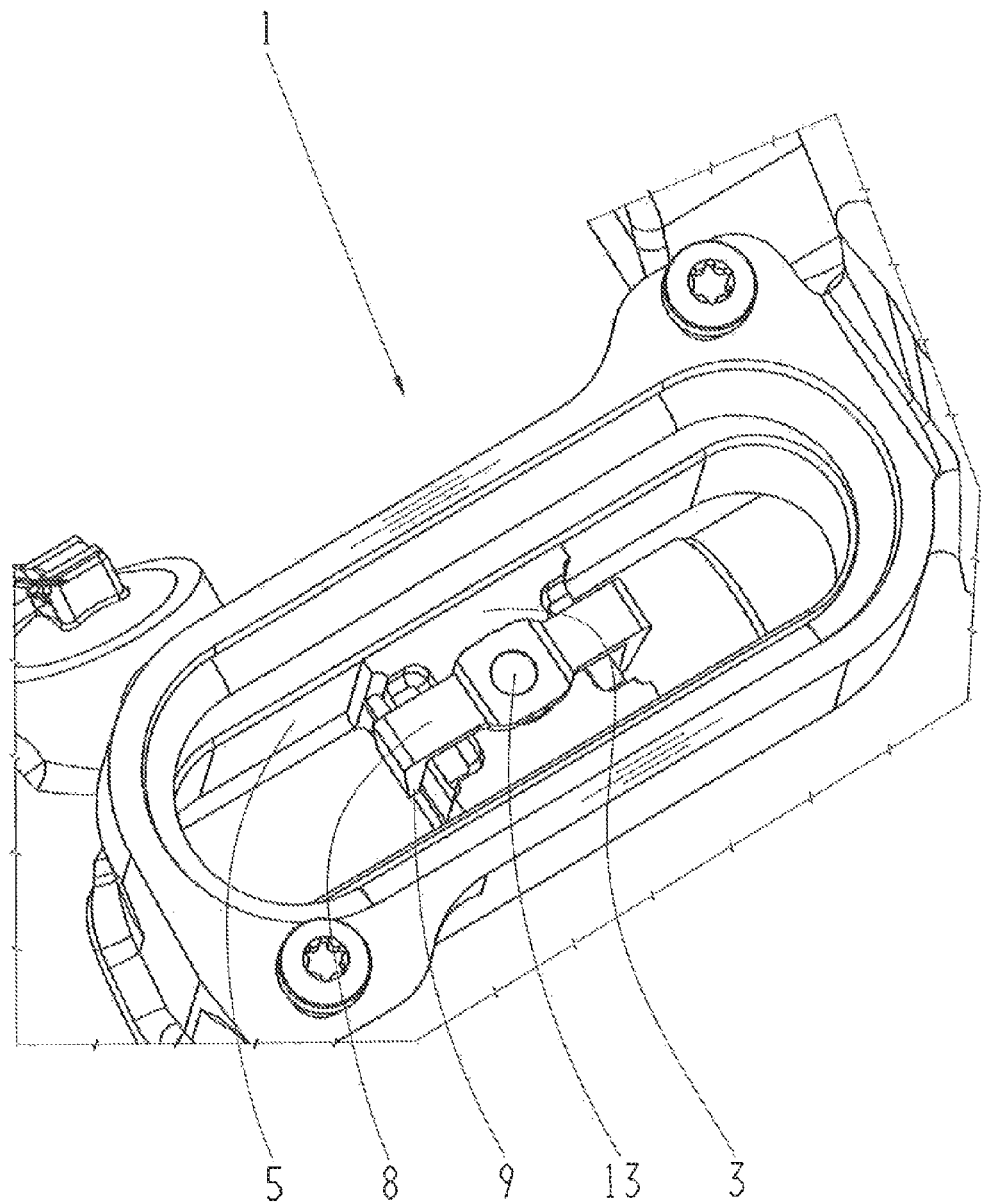
FIG. 4: A perspective view of an adjustment device according to the invention with its slide-block and axial guide.
Figure 5:
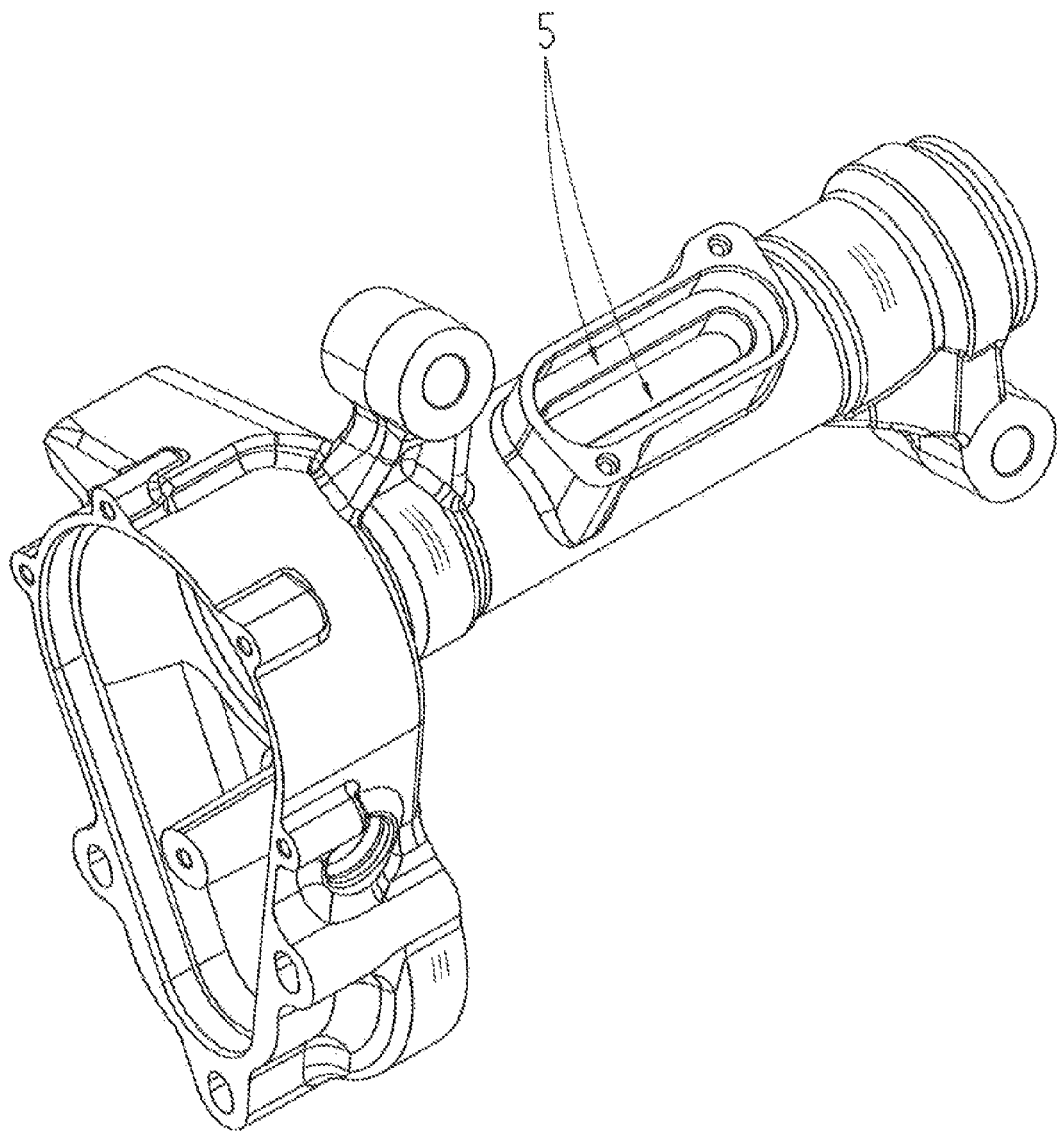
FIG. 5: A view showing a slide track for the slide-block in the axial guide of an adjustment device according to the invention.

The sensor element 6 comprises a guide 5 for the slide-block 3, which guide 5 can be seen particularly clearly in FIGS. 4 and 5. The guide 5 limits the travel path of the slide-block 3 and guides it in the axial direction of the spindle 2. Accordingly, the guide 5 is also called the axial guide. The slide-block 3 has sliding surfaces 22 (see in particular FIG. 2), which slide in or along the guide 5.

The sensor element 6 interacts with a sensor impulse emitter 13, which sensor impulse emitter 13 can be seen for example in FIG. 4, which shows a view from above of the adjustment device according to FIG. 1 but without the sensor element 6. The sensor impulse emitter 13 is arranged in the holder 8, which holder 8 in turn is locked by its detent elements 9 onto the retaining structure 7 of the slide-block 3. The sensor impulse emitter 13 can preferably be in the form of a magnet (permanent magnet).

Figure 6:
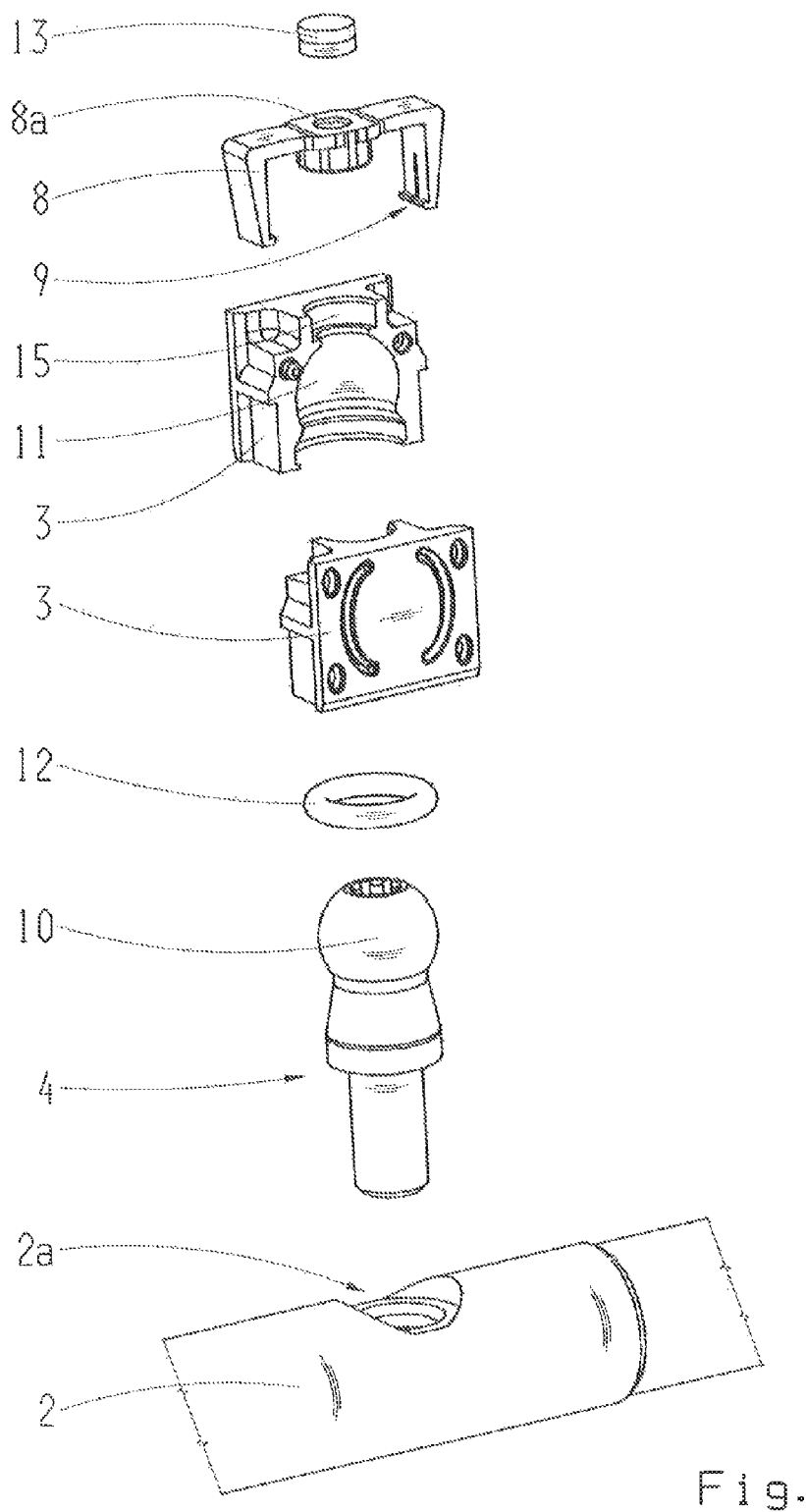
FIG. 6: An exploded representation of the parts of the adjustment device according to the invention shown in FIG. 1, with its slide-block, connecting element and spindle.

FIG. 6 shows an exploded representation of individual parts of the adjustment device in FIG. 1, but without the sensor element 6. The spindle 2 again has a holding aperture 2a. Above the spindle 2 FIG. 6 shows the connecting element 4, which connecting element 4 comprises a joint head 10. Above the connecting element 4 is shown a locating element 12 in the form of an O-ring. Above the locating element 12 are shown two different views of one and the same slide-block 3, namely a view from the side and a sectioned view in which it can be seen that the slide-block 3 comprises a joint cup 11. Above is the holder 8, as described earlier, with its detent elements 9, in which the sensor impulse emitter 13 is held in the recess indexed 8a. At the very top of FIG. 6 is shown a sensor impulse emitter 13.

To fit the slide-block 3 onto the spindle 2 the connecting element 4 is first inserted with its cylindrical end into the holding aperture 2a of the spindle 2. The locating element 12 is then positioned on the connecting element 4. After that, the slide-block 3 is fitted with its joint cup 11 over the joint head 10 of the connecting element 4. Then, the detent elements 9 of the holder 8 lock onto the retaining structure 7 of the slide-block 3. In the final step the sensor impulse emitter 13 is fitted into the recess 8a in the holder 8.

Figure 7:
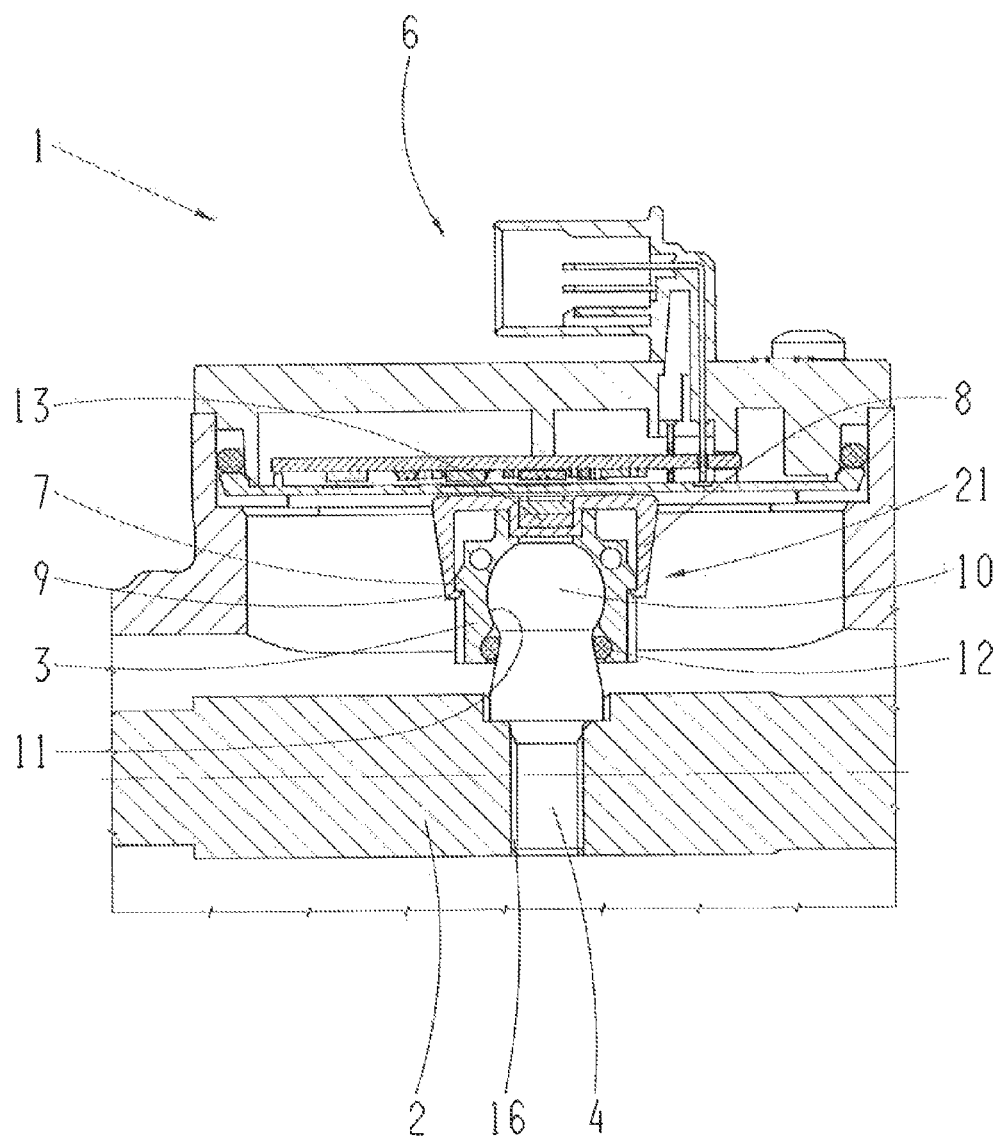
FIG. 7: A sectioned view of the adjustment device according to the invention represented in FIG. 6, in the assembled condition.

FIG. 7 shows a sectioned view of the adjustment device 1 of FIG. 6 in the assembled condition. The connecting element 4 is screwed into a thread 16 of the spindle 2 in the area of the holding aperture 2a. The connecting element 4 comprises a joint head 10. A locating element 12 is positioned below the joint head 10. The slide-block 3 is fitted onto the joint head 10. The retaining structure 7 of the slide-block 3 is functionally locked onto the detent elements 9 of the holder. The sensor element 6 is positioned above the slide-block 3.

Figure 8:
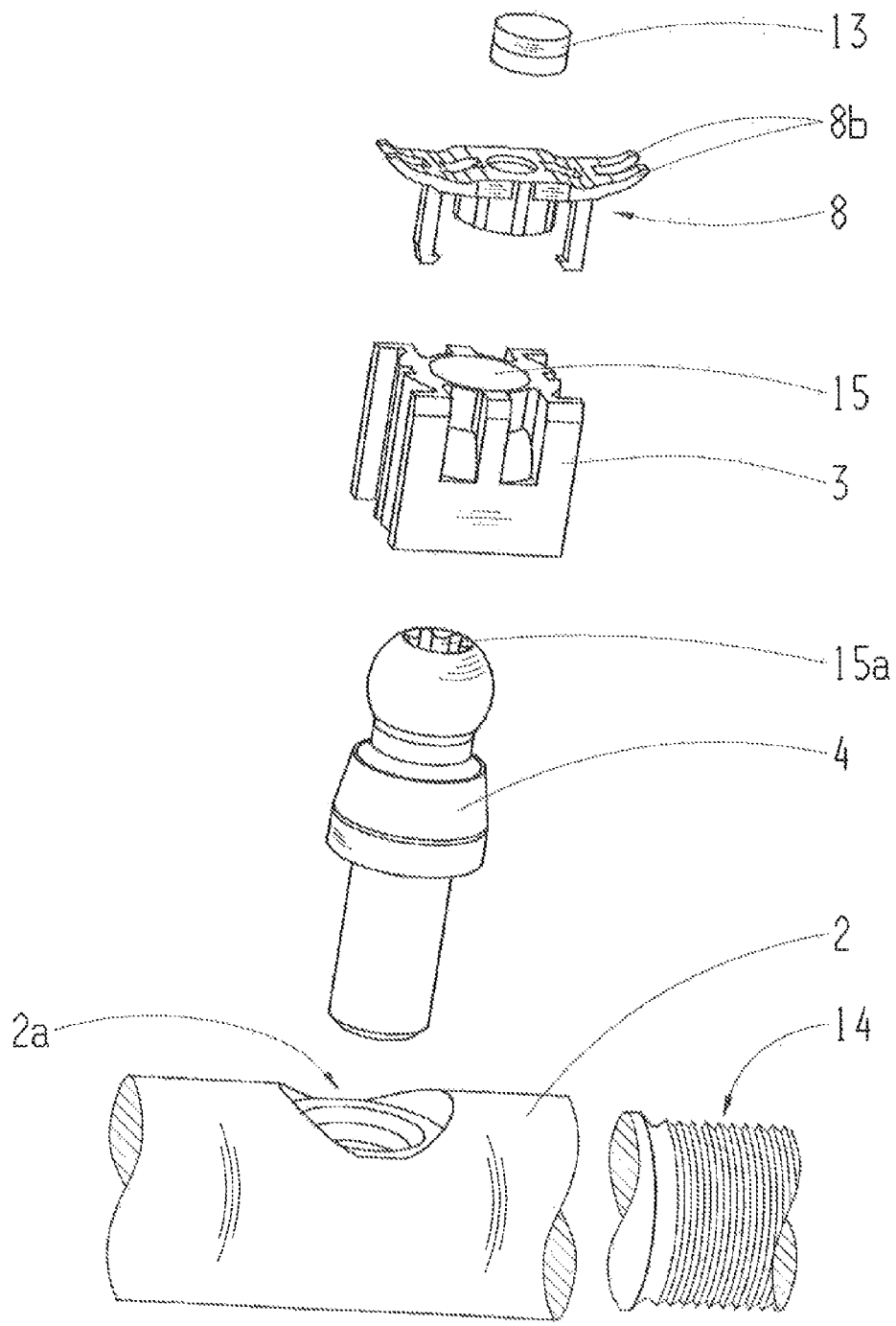
FIG. 8: An exploded representation of an alternative adjustment device according to the invention, with its slide-block, connecting element and spindle.

FIG. 8 shows an alternative design of the arrangement shown in FIG. 6, particularly in the area of the holder 8. In this design version, on its upper side facing away from the slide-block 3 the holder 8 has lateral, wing-like elements 8b. In addition FIG. 8 shows the thread 14 of the spindle 2.

Figure 9:
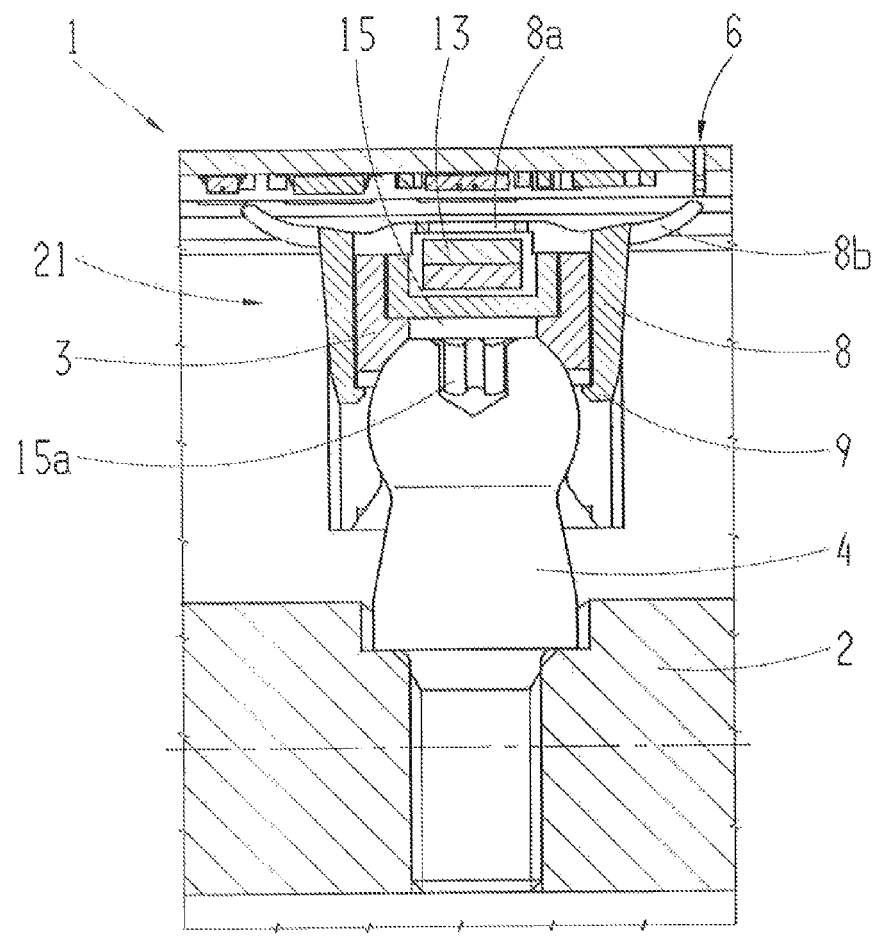
FIG. 9: A sectioned view of the adjustment device according to the invention represented in FIG. 8.

FIG. 9 shows a sectioned representation of the adjustment device 1 according to FIG. 8, in the assembled condition.

Figure 10:
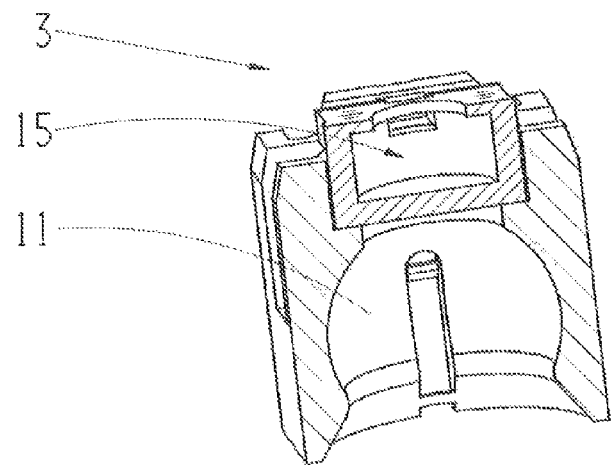
FIG. 10: A sectioned representation of the slide-block of an adjustment device according to the invention.

FIG. 10 shows a sectioned view of the slide-block 3 with its fitting bore 15 that allows actuation of the expansion means (not shown) by virtue of which the ball-and-socket joint (joint cup 11) is locked.

FIGS. 11A to 14 show an alternative embodiment of the adjustment device 1 according to the invention, and will therefore be described conjointly.

Figure 11A:
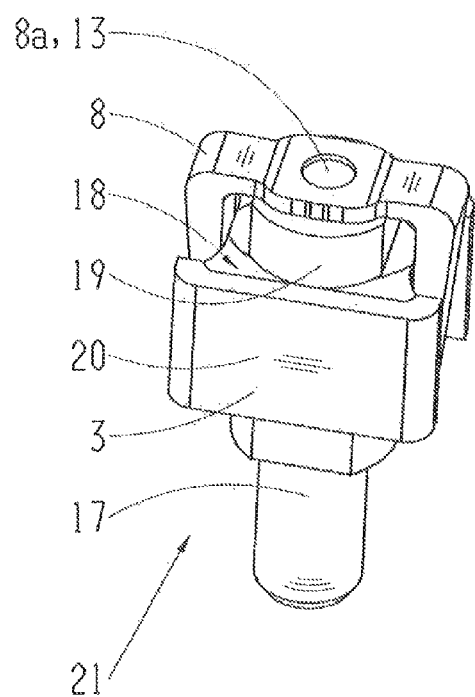
FIG. 11A: An exploded representation of an alternative embodiment of a connecting element and slide-block.
Figure 11B:
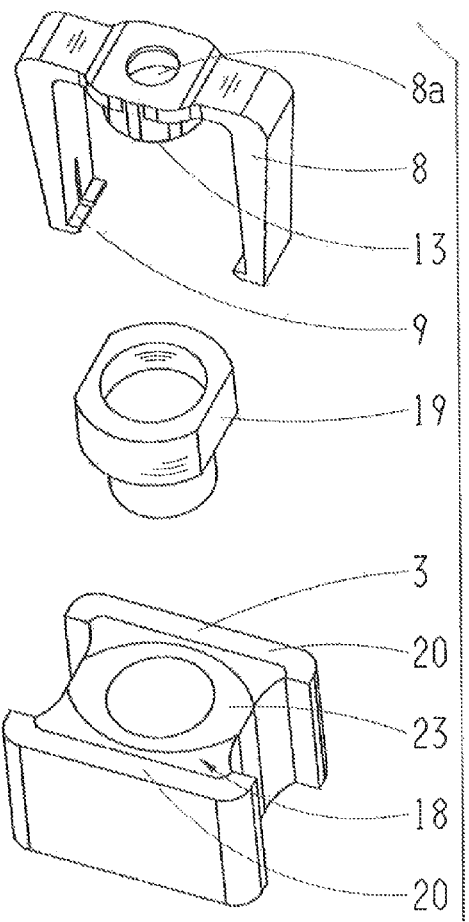
FIG. 11B: A view of the connecting element and slide-block according to the invention shown in FIG. 11A.
Figure 11B:
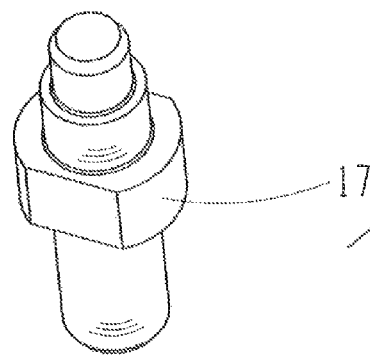

FIG. 11A shows an exploded representation of an alternative embodiment of the slide-block connection and FIG. 11B shows a view of the individual parts in their assembled condition. At the bottom of FIGS. 11A, 11B an alternative connecting element 17 is shown. Above the connecting element 17 is shown a slide-block comprising an integrated rubber mounting (elastic joint element) 18. Above the rubber mounting is a fastening element 19. At the top of FIG. 11A is shown the holder 8 with its detent elements 9 and the recess 8a for the impulse emitter 13, as already known from FIG. 1. The rubber mounting or joint element 18 connects an inner sleeve 23, preferably made of metal, which sleeve receives the connecting element 17, to the sliding surfaces (skids) 20. The skids 20 are for example made of plastic. The connecting element 17 is for example made of steel.

The partial representation pictured in FIG. 11B shows the individual elements when assembled together. With its free end the connecting element 17 is held in the inner sleeve 23 and connected to the fastening element 19. The holder holds the impulse emitter 13 and connects it to the slide-block 3.

Figure 12:
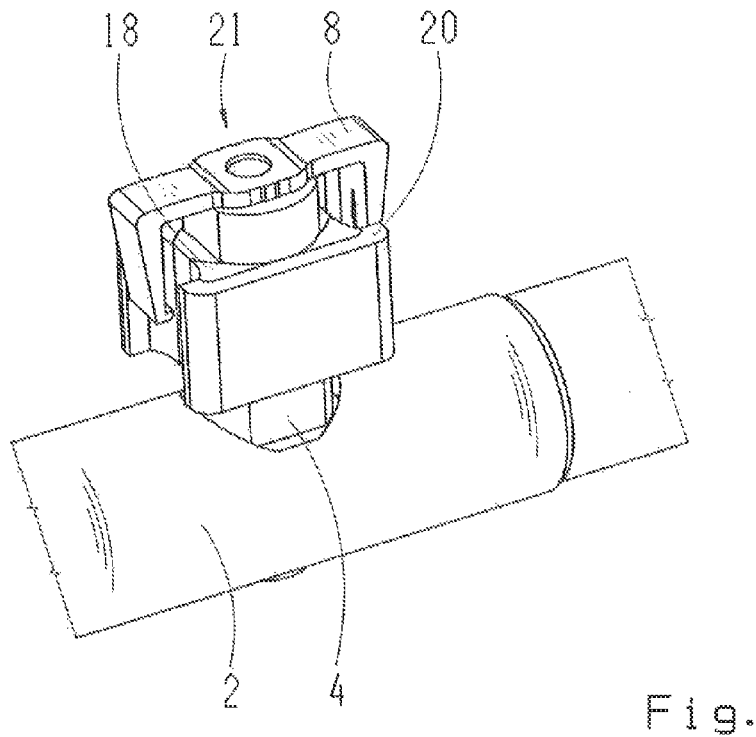
FIG. 12: The slide-block shown in FIG. 11, when mounted on a spindle.

FIG. 12 shows the elements in FIGS. 11A, 11B fitted on the spindle 2.

Figure 13:
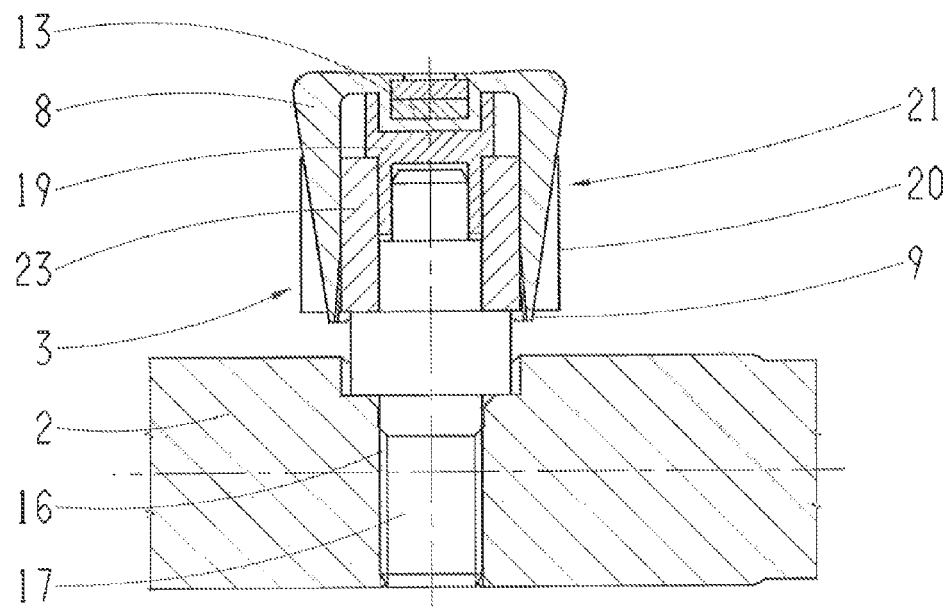
FIG. 13: A sectioned view of the slide-block mounted on the spindle as shown in FIG. 12.

FIG. 13 shows a sectioned view of the arrangement in FIG. 12. The connecting element 17 is screwed into the thread 16 of the spindle 2. On the connecting element 17 is arranged the slide-block 3 with its rubber mounting. The holder 8 holds the impulse emitter 13 and connects it to the slide-block 3.

Figure 14:
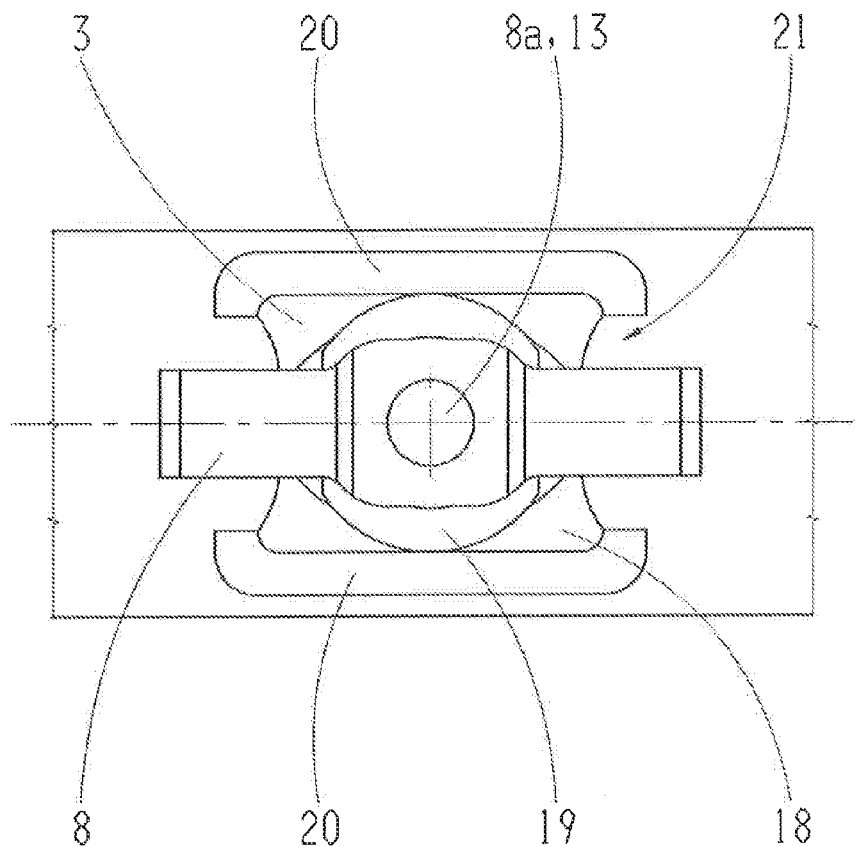
FIG. 14: A view from above, of the slide-block shown in FIGS. 12 and 13, in the assembled condition.

FIG. 14 shows a schematic representation of a top view of the slide-block 3. Clearly visible are in particular the skids 20 and the holder 8. The rubber mounting 18 is located between the inner sleeve (not shown) and the skids 20.

INDEXES

1 Adjustment device
2 Spindle
2a Holding aperture
3 Slide-block
4 Connecting element
5 Guide
6 Sensor element
7 Retaining structure
8, 8b Holder
8a Recess
9 Detent elements
10 Joint head
11 Joint cup
12 Locating element
13 Sensor impulse emitter
14 Thread
15 Bore
15a Expansion means
16 Thread
17 Connecting element
18 Rubber mounting
19 Fastening element
20 Skids
21 Articulated joint
22 Sliding surface
23 Inner sleeve
X Spindle axis

The invention claimed is:

1. An adjustment device (1) for a chassis of a vehicle comprising:
    at least one spindle (2),
    at least one slide-block (3), having a signal emitter coupled thereto,
    an axial guide (5) for the slide-block (3), and
    at least one connecting element (4, 17),
    the at least one connecting element (4, 17) being arranged in a rotationally fixed manner on the spindle (2) and being connected to the slide-block (3), and
    an articulated joint (21) being provided between the connecting element (4, 17) and the slide-block (3).

2. The adjustment device (1) according to claim 1, wherein a spacing of the articulated joint (21) from an axis (X) of the spindle (2) is in a range of 5 to 50 mm.

3. The adjustment device (1) according to claim 1, wherein the slide-block has sliding surfaces (22) which contact the axial guide (5) and are made of at least one of polyacetal, a material resistant to elevated temperatures, PTFE (polytetrafluoroethylene), PPS (polyphenylsulfide) and PPS GF40 PTFE5 (a PPS with a glass-fiber content of 40%).

4. The adjustment device (1) according to claim 1, wherein the articulated joint (21) comprises an articulation that is lockable.

5. The adjustment device (1) according to claim 1, wherein the articulated joint (21) is a ball-and-socket joint with a joint head (10) and a joint cup (11).

6. The adjustment device (1) according to claim 5, wherein the joint head (10) is formed on the connecting element (4) and the joint cup (11) is formed in the slide-block (3).

7. The adjustment device (1) according to claim 5, wherein the joint head (10) is securable within the joint cup (11) of the slide-block (3).

8. The adjustment device (1) according to claim 7, wherein expansion means (15a) are provided in the joint head (10) to facilitate desired expansion of the joint head (10).

9. The adjustment device (1) according to claim 8, wherein at least one bore (15) is provided in the slide-block (3) through which a tool, for actuating the expansion means (15a), is introduced, and the bore (15) is formed on a side of the slide-block (3) facing away from the spindle (2).

10. The adjustment device (1) according to claim 1, wherein a locating element (12) for at least one of centering the slide-block (3) and keeping the slide-block (3) in a neutral position is positioned in the slide-block (3).

11. The adjustment device (1) according to claim 1, wherein the slide-block (3) comprises an elastic joint element, in a form of a rubber mounting (18), for forming the articulated joint (21).

12. The adjustment device (1) according to claim 11, wherein the slide-block (3) has flat sliding elements (20) which are arranged on the elastic joint element (18).

13. The adjustment device (1) according to claim 11, wherein the slide-block (3) comprises at least one fastening element (19, 23), which is designed for positioning the slide-block (3) on the connecting element (17), and the fastening element (23) is embedded in the elastic joint element (18) and is in a form of an inner sleeve (23).

14. An adjustment device (1) for a chassis of a vehicle comprising:
   at least one spindle (2),
   at least one slide-block (3),
   an axial guide (5) for the slide-block (3), and
   at least one connecting element (4, 17),
   the at least one connecting element (4, 17) being arranged in a rotationally fixed manner on the spindle (2) and being connected to the slide-block (3),
   an articulated joint (21) being provided between the connecting element (4, 17) and the slide-block (3), and
   a holder (8), for a sensor impulse emitter (13), being provided on the slide-block (3).

15. The adjustment device (1) according to claim 14, wherein the holder (8) comprises at least one detent element (9) which, when joined to the slide-block (3), co-operates with a complementary retaining structure (7) of the slide-block (3).

16. An adjustment device of rear wheel steering system of a chassis of a vehicle comprising:
   at least one spindle,
   at least one slide-block,
   an axial guide for the slide-block, and
   a connecting element,
   one end of the connecting element being secured in a rotationally fixed manner to the spindle, and
   an opposite end of the connecting element being received within the slide-block such that the connecting element is pivotable with respect to the slide-block, the connecting element and the slide-block forming an articulated joint, and the slide-block having opposed sliding surfaces which mate with guiding surfaces of the axial guide such that the axial guide directs movement of the slide-block with respect to the axial guide to adjust a steering angle.

* * * * *